US 2,973,298
Patented Feb. 28, 1961

2,973,298
SULFONAMIDE DRUG AND TEREPHTHALIC ACID COMPOSITION

Tevis M. Goldhaft and Charles Kaitz, Vineland, N.J., assignors to Vineland Poultry Laboratories, Vineland, N.J., a partnership No Drawing. Filed Dec. 29, 1958, Ser. No. 783,140

9 Claims. (Cl. 167—51.5)

The value of the sulfonamide drugs in the veterinary field for treating certain diseases in fowl and animals such as poultry, cattle, dogs, hogs, sheep and the like is well recognized and while the exact way in which the drugs act is not known, it is an established fact that the sulfonamides must be caused to enter into the blood stream in order to be effective. The effectiveness of treatment in turn depends upon the time that it takes the drug to enter into the blood stream and the amount and period of time that it is maintained in the blood during treatment. The sulfonamide drugs are useful in the treatment of bacterial and parasitic diseases such as infectious coryza, coccidiosis, fowl cholera and fowl typhoid in poultry and pneumonia, strangles and other respiratory infections of horses, in mastitis, metritis and foot rot in cattle, pneumonia and mastitis in sheep and various bacterial infections in swine, dogs and cats.

The present application is based upon our discovery that when the sulfonamide drugs are fed or given in drinking water in combination with a water soluble form of terephthalic acid such as the water soluble sodium salt thereof the speed of absorption of the drug is significantly increased and there is a remarkable increase in the amount of sulfonamide absorbed by the blood stream. As a result significant levels for treatment may be more quickly established and maintained in the blood stream with only small amounts of the sulfonamide drug and this is extremely important commercially because of the high cost of the drug. On the other hand a higher level of concentration may be established and maintained in the blood stream for a longer period of time than is possible with the sulfonamides alone.

The term "sulfonamide drugs" as used herein is intended to include that group of chemicals which have as their basic structure p-aminobenzenesulfonamide. From this parent compound, sulfonilamide, various related compounds are made usually by substituting or adding various groups to the sulfon radical. Some examples of the known sulfonamide drugs include prontosil, neoprontosil, benzyl sulfanilamide, sulfathiazole, sulfasuccidine, sulfaguanidine, sulfadiazine, sulfamerazine, sulfanilyl sulfanilamide, sulfanilyl dimethyl sulfanilamide, sulfapyridine, sulfachloropyrazine, sulfamethazine, sulfadimetine, sulfaquinoxaline, sulfisoxazole, sulfacetamide, sulfabenzamide, succinylsulfathiazole, phthalylsulfathiazole, p-nitrosulfathiazole, and sulfamylon. The term "sulfonamide drugs" includes the sulfonamides as well as the active salts and complexes thereof.

Any water soluble form of terephthalic acid such as the sodium, potassium, calcium or ammonium salts may be employed in combination with the sulfonamide drugs. Our new composition of the sulfonamide drug and water soluble terephthalic acid may be administered in any desired manner as for example by feeding the composition as a powder in feed or drinking water, or a suitable non-toxic carrier may be employed and the composition may be administered as a tablet, liquid, or capsule. Each of the ingredients may be administered separately or if desired one ingredient may be incorporated in the feed and the other in drinking water.

Best results are achieved by adding the composition to drinking water and this is of particular advantage since control of treatment is more readily achieved because the water soluble composition will be uniformly distributed in water which may not be true when the composition is incorporated into feed by mixing. Another advantage in using drinking water is that a sick fowl or animal will usually drink water even though it may stop eating. If desired the water insoluble terephthalic acid itself may be used in place of the water soluble form in feed but no advantage is gained and we believe that the speed and amount of composition absorbed in the blood stream is greater when the water soluble form is employed. As used in the specification and claims the term "terephthalic acid compound" is intended to mean the water insoluble form of the acid itself as well as the water soluble forms such as the sodium salt.

Any of the feeds ordinarily used may be enriched with our sulfonamide drug terephthalic acid compound and the methods customarily used are employed for mixing the composition in feed or drinking water. Feed compositions and the methods of mixing enrichment ingredients such as vitamins or other additives with feed or drinking water are well known in the art and will not be described in detail herein.

The concentration of sulfonamide drug in the blood stream and duration of treatment required for any particular disease are known in the art and only very limited amounts of our composition are required to establish the proper concentration for treatment. In general excellent results are achieved with feed or drinking water by using about 1 to 100 parts by weight of the sulfonamide drug for 8000 parts by weight of feed, and from about 1 to 50 parts by weight of the sulfonamide drug for 20,000 parts by weight of drinking water. The amount of terephthalic acid compound is about 1 to 10 parts by weight for each 1000 parts by weight of feed and about 1 to 10 parts by weight for each 2500 parts by weight of drinking water. These amounts apply to the ordinary known diseases such as those described hereinabove, but of course the amounts may be increased as desired for the particular disease at hand. Generally speaking no more than about 25% increase over the amounts specified will be required for treatment. Just the presence of the acid compound in combination with the sulfonamide drug is sufficient to achieve the beneficial results of the present invention and excellent results are achieved by using between about 0.01 to 5.0 parts of the acid compound for each part of the sulfonamide drug. We prefer to use between about 0.1 to 2 parts of the acid compound for each part of the sulfonamide drug.

Some illustrative examples showing the remarkable increase in the amounts of the sulfonamide drugs that are caused to be absorbed into the blood stream by our novel composition follow:

Example 1

500 milligrams of sodium sulfathiazole in water was instilled into the crop of each of six birds through a pipette. Immediately thereafter 360 milligrams of water soluble sodium terephthalate in water was administered in the same manner into three of the chickens that had received the sulfonamide drug. Two hours after treatment samples of blood were taken from all of the chickens and colorimeter tests were run in standard manner to determine the concentration of the sulfonamide drug in the blood. The average reading for the chickens that had received the sulfonamide drug alone was 264 while the average reading for the chickens that received the combination of the sulfonamide drug and terephthalic acid compound was 337. The average reading for chickens which did not receive either drug or terephthalic acid compound was 37.

Four hours after treatment samples of blood were again taken and the average colorimeter reading for chickens that received the sulfonamide alone was 94 while the reading for chickens that received the sulfonamide drug and terephthalic acid compound was 233. The results show higher initial blood levels of the sulfonamide drug when combined with the terephthalic acid compound and remarkably higher levels at the end of four hours. While we do not now know the exact way in which the terephthalic acid compound works it is apparent from the high blood levels of sulfonamide drug which we achieve that the terephthalic acid compound in some way reacts chemically with the drug to form a compound of addition or complex which is more quickly absorbed and maintained in the blood stream than the sulfonamide drug alone.

Example 2

The method, ingredients and amounts of ingredients of Example 1 were repeated using sulfachloropyrazine in place of the sodium sulfathiazole. Twenty-four hours after treatment samples of blood were taken from all of the test chickens and colorimeter tests were run. The twenty-four hour average test reading for the drug alone was 211 while the reading for the sulfachloropyrazine-terephthalic acid compound was 276. The blank reading was 37 for chickens that did not receive any sulfonamide drug or acid compound.

Example 3

The method, ingredients, and amounts of ingredients of Example 1 were repeated using a triple sulfonamide drug in place of the sodium sulfathiazole. The triple sulfonamide drug included equal parts of sodium sulfathiazole, sodium sulfadiazine and sodium sulfamerazine. At the end of twenty-four hours the average colorimeter reading for the drug alone was 28 while the reading for the drug-terephthalic acid compound was 155. The blank reading was 37. The results of this test were certainly unexpected in that there was no trace of the drug in the blood where it was used alone while the drug and acid combination gave a remarkably high level of drug concentration in the blood at the end of twenty-four hours.

Example 4

Sodium sulfathiazole was mixed into a growing mash feed in the proportion of 9 grams of sulfathiazole for each pound of feed. Drinking water was made up to contain 7.2 grams sodium terephthalate for each 8½ pounds of water. Two groups of three adult chickens each were employed in this test.

Group A were fed ordinary plain drinking water along with the feed that contained the sulfonamide drug for eighteen hours. The second group B were fed the same feed as the first group but their drinking water contained the terephthalic acid compound. Group B were fed for the same eighteen hour period.

Colorimeter tests were made at the end of twenty-four hours and the amount of sulfonamide drug in the blood of the birds of group B was materially greater than that of the birds of group A. The average colorimeter reading for group B was 215 as compared to an average colorimeter reading of 75 for group A.

Example 5

In this example the procedure specified in Example 1 was employed on three separate groups of birds. There were three birds in each group. Group 1 was given 500 milligrams of sodium sulfathiazole alone. Group 2 was given 500 milligrams of sodium sulfathiazole along with 360 milligrams of sodium terephalate and group 3 was given 500 milligrams of sodium sulfathiazole along with 720 milligrams of sodium terephthalate. Colorimeter tests were made five hours after treatment. At the end of five hours the blood of the birds of group 1 had a very low level of sulfonamide whereas the blood of the birds of groups 2 and 3 showed a significantly high level of the sulfonamide drug in the blood.

Example 6

In this example the procedure, ingredients, and amounts of ingredients specified in Example 1 are employed with the exception that the potassium terephthalate is used in place of the sodium salt. The results are comparable to those obtained in Example 1.

Example 7

In this example the procedure, ingredients, and amounts of ingredients specified in Example 1 are employed with the exception that the ammonium terephthalate is used in place of the sodium salt. The results are comparable to those obtained in Example 1.

Example 8

In this example the procedure, ingredients and amounts of ingredients specified in Example 1 are employed with the exception that water insoluble terephthalic acid is given in a capsule. In this test the amount of sulfonamide drug in the blood stream of birds that are given the sulfonamide drug and terephthalic acid compound is materially higher than that of birds that are given the sulfonamide drug alone.

Example 9

In this example 14–15 week old white Leghorn chickens are inoculated into the sinuses with an active culture of bacterium, *Hemophilus gallinarum*, the cause of infectious coryza. 72 hours later all the birds in the test show swellings in the sinuses and a nasal discharge typical of the disease.

One group of inoculated birds are given a ½ gram dose of sodium sulfathiazole in solution with a pipette into the crop each day for five days.

A second group of inoculated birds are given ½ gram of sodium sulfathiazole solution with a pipette into the crop and 360 milligrams of solubilized terephthalic acid (sodium terephalate) daily for the five day period.

A third group of five birds are left untreated.

The birds are observed daily for five days from the start of treatment and at the end of that time the five untreated birds will show swellings in the sinuses and a purulent nasal discharge.

The five birds given sodium sulfathiazole alone will show no improvement 48 hours after treatment but 72 hours after treatment three of the five will be normal and the other two will still have a heavy nasal discharge.

All of the five birds in the group given sodium sulfathiazole and solubilized terephthalic acid will be normal 72 hours after treatment and recovery will be noted in some of the birds as early as 48 hours after treatment.

The results of this test show that the use of solubilized terephthalic acid materially increases the effectiveness of the sodium sulfathiazole which is fairly specific for this infection. Sulfonamide blood level taken during the test period for all three groups will show a continuously high level in the group which are given sodium sulfathiazole and solubilized terephthalic acid over that in the group that receive sodium sulfathiazole alone.

It will be understood that it is intended to cover all changes and modifications of the preferred form of invention herein chosen for the purpose of illustration which do not constitute departures from the spirit and scope of the invention.

What is claimed is:

1. A composition which comprises a sulfonamide drug and an essential active ingredient selected from the group consisting of terephthalic acid and the salts thereof.

2. A composition for treating disease in fowl and animals which comprises a non-toxic carrier which includes as an essential active ingredient thereof a composition of a sulfonamide drug and a compound selected from the group consisting of terephthalic acid and the salts thereof.

3. A composition as specified in claim 2 in which the sulfonamide drug is sodium sulfathiazole and in which the terephthalic acid compound is sodium terephthalate.

4. An aqueous composition for treating diseases in veterinary fowl and animals which includes as an essential active ingredient thereof the composition of a sulfonamide drug and a compound selected from the group consisting of terephthalic acid and the water soluble salts thereof.

5. A composition for combating infectious disease in veterinary animals and fowl which includes as essential active ingredients thereof a sulfonamide drug and a compound selected from the group consisting of terephthalic acid and the salts thereof, said compound being present in the proportion of about 0.01 to 5.0 parts for each part of the sulfonamide drug.

6. A composition for combating infectious disease in veterinary animals and fowl which includes as essential active ingredients thereof a sulfonamide drug and a compound selected from the group consisting of terephthalic acid and the salts thereof, said compound being present in the proportion of about 0.1 to 2.0 parts of acid compound for each part of the sulfonamide drug.

7. A feed composition which includes as essential active ingredients thereof a sulfonamide drug and a compound selected from the group consisting of terephthalic acid and the salts thereof.

8. The method of treating diseases in veterinary animals and fowl which comprises the step of administering a sulfonamide drug in the presence of a compound selected from the group consisting of terephthalic acid and the salts thereof.

9. The method of treating diseases in veterinary animals and fowl which comprises the steps of administering a compound selected from the group consisting of terephthalic acid and the salts thereof and thereafter while the terephthalic acid compound is still present in the body administering a sulfonamide drug.

References Cited in the file of this patent

UNITED STATES PATENTS 2,855,340    Kent _____ Oct. 7, 1958

OTHER REFERENCES

Levin: Hatchery Tribune and Feed Retailer, May 1948, pp. 16, 17.